United States Patent [19]

Blount

[11] 3,956,466

[45] May 11, 1976

[54] PRODUCTION OF SILICO-FORMIC ACID

[76] Inventor: David H. Blount, 5450 Lea St., San Diego, Calif. 92105

[22] Filed: Feb. 21, 1975

[21] Appl. No.: 551,534

Related U.S. Application Data

[63] Continuation-in-part of Ser. No. 262,485, June 14, 1972, which is a continuation-in-part of Ser. No. 71,628, Sept. 11, 1970, abandoned.

[52] U.S. Cl. .................................. 423/325; 423/551
[51] Int. Cl.² .................... C01B 15/14; C01B 32/20
[58] Field of Search ........... 423/325, 551, 553, 544, 423/324, 579

[56] References Cited
UNITED STATES PATENTS 3,674,430   7/1972   Illigen et al. .................... 423/325 D 3,826,814   7/1974   Illigen et al. .................... 423/325 X

OTHER PUBLICATIONS

Mellor; J. W., A Comprehensive Treatise On Inorganic And Theoretical Chemistry, Vol. VI, pp. 216, 228 (1925).

*Primary Examiner*—L. Dewayne Rutledge
*Assistant Examiner*—Michael L. Lewis

[57] ABSTRACT

A dry alkaline earth metal silicate or an alkali metal silicate is reacted with an acid hydrogen containing salt to form silico-formic acid.

7 Claims, No Drawings

PRODUCTION OF SILICO-FORMIC ACID

CROSS-REFERENCE TO RELATED APPLICATION

This application is a continuation-in-part of my U.S. patent application Ser. No. 262,485, filed June 14, 1972, which is a continuation-in-part of U.S. patent application Ser. No. 71,628, filed Sept. 11, 1970, now abandoned.

The present invention relates to a process for the production of silico-formic acid (monosilanic acid) by reacting a dry alkaline earth metal silicate or an alkali metal silicate with an acid salt at about between 30° to 100°C. The alkaline earth metal usually used is calcium metasilicate. The alkali metal silicate usually used is sodium metasilicate, but other alkali metal silicates such as potassium, lithium and cesium may be used. It is necessary to use a dry form of the above silicates to prevent formation of silicic acid and silicon dioxide.

The hydrogen salt (acid salt) usually used is sodium bisulfate (NaHSO$_4$), but other acid hydrogen containing salts as potassium hydrogen sulfate, sodium hydrogen sulfide, sodium dihydrogen phosphate, and sodium bicarbonate may be used.

I have discovered that when a dry alkaline earth metal silicate or an alkali metal silicate is mixed with an acid hydrogen containing salt, the alkalin portion of the silicate will react chemically with the acid salt to form a salt, O$_2$ is evolved, and the hydrogen reacts with the silicate to form silico-formic acid (H.SiO.OH). Considerable heat is produced in the reaction. The salt may be removed by washing the silico-formic acid with water, leaving a white granular substance, silico-formic acid, which may be air dried into a fine granular powder.

I have discovered that the silico-formic acid, when in a dry powder form, is readily soluble in a dilute solution of alkali metal hydroxide and alkali metal salts of a weak acid such as sodium silicate. The silico-formic acid may be precipitated out of the above solution in the form of a gel, which is a thickening and thixotropic agent. The gel may be washed and re-dried at 25° to 75°C and then is readily soluble in the above solutions. When silico-formic acid is heated to above 105° C in air, it changes to silicon dioxide.

Silico-formic acid may be used as a filler in elastomers, phenol resins, urea resins, polyurethane resins, in molding powders, pigments, natural and synthetic rubber, as gas and oil absorbents, as a vehicle for insecticides and aromatics, as an anti-caking agent, as an additive to asphalt and other bituminous materials for the improvement of their mechanical properties, as a thickening and thixotropic agent for many liquids, as an anti-skid agent for paper or plastics, as an anti-locking agent to prevent plastic sheets from sticking, to absorb liquids, as a catalyst, insulating material, flatting agent for paints, lacquers and other organic coatings, as a bodying agent, polishing and abrasive agent, and as a catalyst by impregnating the silico-formic acid with an active catalystic material. Silico-formic acid may be used in the manufacturing of soap, detergents, and in the polymerization process of plastic, elastomers and natural products. Silico-formic acid may be chemically reacted with organic chemicals to form silico-organic chemicals.

It is the primary object of the present invention to produce silico-formic acid; a further object is to provide new and useful silicates.

A still further object is to produce a silicon compound which will readily react with an alkali metal hydroxide to form alkali metal silico-formates, which are readily soluble in water.

Another object is to produce a silicon compound, silico-formic acid, which is soluble in dilute aqueous solutions of alkali metal hydroxide and alkali metal salts of weak acid.

Yet another object is to produce a silicon compound, silico-formic acid, which will react chemically with organic and inorganic compounds and form new and useful silico-organic and silico-inorganic compounds.

My invention will be illustrated in greater detail by the specific examples which follow, it being understood that these are merely illustrative of, and not limited to, procedures which may be used in the production of silico-formic acid.

EXAMPLE I

Dry granular sodium metasilicate penta (Na$_2$SiO$_3$.5-H$_2$O) and sodium hydrogen sulfate (NaHSO$_4$) are mixed in the ratio of 1:2 mols. The reaction starts in 1 to 2 minutes; oxygen is evolved and considerable heat is produced from the reaction. The reaction is completed in 1 to 2 hours, leaving a white granular mixture of silico-formic acid (H.SiO.OH) and sodium sulfate. The sodium sulfate is removed by washing the silico-formic acid with water; the silico-formic acid is then air dried and forms a fine white granular compound.

Chemical reactions for Example I:

$$2Na_2SiO_3 + 4NaHSO_4 \rightarrow 2H.SiO.OH + 4Na_2SO_4 + O_2 \quad (1)$$

EXAMPLE II

Dry granular potassium metasilicate is mixed with dry potassium hydrogen sulfate in the ratio of 1:2 mols. The reaction is started in 1 to 4 minutes; oxygen is evolved and considerable heat is produced. The reaction is completed in 1 to 2 hours, producing a white granular mixture of silico-formic acid (H.SiO.OH) and potassium sulfate. The mixture is washed with water and filtered to remove the potassium sulfate. The silico-formic acid is then air dried and forms a fine, white, granular powder.

EXAMPLE III

Dry granular sodium metasilicate is mixed with sodium dihydrogen phosphate (NaH$_2$PO$_4$) in the ratio of 1:2 mols. The mixture is then heated to 50° to 75° C to speed up the reaction. Oxygen is evolved from the mixture, and the reaction is completed in 1 to 4 hours, producing a fine, white, granular mixture of silico-formic acid (H.SiO.OH) and sodium phosphate dibasic. The mixture is washed with water and filtered to remove the sodium phosphate dibasic. The silico-formic acid is then air dried and forms a fine, white, granular powder.

What is claimed as new and desired to be protected by Letters Patent is set forth in the appended claims.

1. The method of producing silico-formic acid (H.SiO.OH) by chemically reacting an alkali metal metasilicate with an acid hydrogen containing salt in the ratio of 1:2 mols by the following steps; whereby
   a. the alkali metal metasilicate is mixed with an acid hydrogen containing salt, and the reaction is completed in 1 to 2 hours; at about between 30° to 100°C, and oxygen is evolved from the reaction, leaving a white granular mixture, containing alkali metal salt and silico-formic acid;

b. the white granular substance is washed with water, filtered to remove the alkali metal salt, and then air dried at 25° to 75° C., leaving a fine white granular compound, silico-formic acid.

2. The method of claim 1 wherein the alkali metal metasilicate is sodium metasilicate pentahydroxide ($Na_2SiO_3 \cdot 5H_2O$).

3. The method of claim 1 wherein the alkali metal metasilicate is sodium metasilicate.

4. The method of claim 1 wherein the alkali metal metasilicate is potassium metasilicate.

5. The method of claim 1 wherein the acid hydrogen containing salt is sodium hydrogen sulfate.

6. The method of claim 1 wherein the acid hydrogen containing salt is potassium hydrogen sulfate.

7. The method of claim 1 wherein the acid hydrogen containing salt is sodium dihydrogen phosphate ($NaH_2PO_4$).

* * * * *